Nov. 10, 1964  W. C. JONES, JR  3,156,546
GAS CHROMATOGRAPHIC SEPARATION AT HIGH TEMPERATURE OPERATION
Filed Nov. 3, 1960  2 Sheets-Sheet 1

INVENTOR.
WILLIAM C. JONES, JR.,
BY
ATTORNEY.

INVENTOR.
WILLIAM C. JONES, JR.,
BY
ATTORNEY.

_United States Patent Office_  3,156,546
Patented Nov. 10, 1964

3,156,546
GAS CHROMATOGRAPHIC SEPARATION AT HIGH TEMPERATURE OPERATION
William C. Jones, Jr., Baytown, Tex., assignor, by mesne assignments, to Esso Research and Engineering Company, Elizabeth, N.J., a corporation of Delaware
Filed Nov. 3, 1960, Ser. No. 67,122
2 Claims. (Cl. 55—67)

The present invention is directed to the separation of hydrocarbon mixtures. More particularly, the invention is directed to an improved liquid solvent for use in partition chromatography and a method of using the same. In its more specific aspects, the invention is directed to vapor-liquid partition chromatography at elevated temperatures.

The invention may be briefly described as a method for separating vaporous hydrocarbon mixtures including petroleum sulfur compounds which comprises contacting the vaporous hydrocarbon mixture admixed in a stream of inert gas with a liquid phase absorbent in an elongated column, wherein the liquid phase absorbent is stationary within the column. The separated constituents may be recovered as purified products, or the invention may be used only in analyzing the content of the mixed hydrocarbon sample. The liquid phase solvent is, by the teaching of the present invention, polyepichlorohydrin having an average molecular weight in the range of 400 to 2000, a preferred average molecular weight being 1150. The liquid absorbing solvent may suitably be employed on an inert support such as firebrick, diatomaceous earth, celite, etc., or it may be used in a column without the use of such solid support if the column has a length-to-diameter ratio in the range from about 5,000 to 1 to about 250,000 to 1.

Where a support such as firebrick or diatomaceous earth is employed, the solid support is of a particle size to lie within the range of 40 to 60 standard mesh, and the liquid may constitute from about 1.0 to 50.0 weight percent of the support.

The hydrocarbon mixture including sulfur compounds is carried through the column by an inert gas which is preferably helium, but other inert gases such as argon, nitrogen, hydrogen, carbon dioxide, neon, etc., may be employed.

The temperature employed in the practice of the present invention may range from about 64° C. to above 250° C.

Inlet pressures to the column may range from about 1 to 100 p.s.i.g. with inlet pressures in the range from about 20 to about 60 p.s.i.g. giving desirable results.

Many materials are useful for the separation of mixtures on roughly a boiling point basis at operating temperatures up to about 250° C. Multicomponent mixtures, however, usually include different types of hydrocarbons having similar boiling points which cause more or less interference with the gas chromatographic analysis when a strictly boiling point separation is relied upon. To overcome this problem of boiling point overlap, it is customary to use a polar stationary liquid in a gas chromatographic separation. At lower temperatures, the use of these polar liquids presents no particular problem, that is to say, with hydrocarbons boiling in the 50° to 60° C. range. However, in the analysis of higher boiling multicomponent mixtures, e.g. boiling in the range of 100° to 600° C., the known polar stationary liquids have proven to be quite unsatisfactory because, as a general rule, the boiling point of the solvent is low enough to cause considerable vaporization within the analyzing column. It is obvious that the vapor from the stationary liquid passing overhead with the sample stream will interfere with the analysis of the chromatographically separated components of the sample stream. The stationary liquids of this invention, however, do not volatilize at higher temperatures and are suitable for use in gas chromatographic analysis of mixtures in the boiling range of 100° C. and above, up to and exceeding 250° C.

The basis for selecting polar stationary liquids for gas chromatographic separation because of chemical structure, internal forces and solution interactions seems to be no better defined or organized than is described by Keulemans in his book "Gas Chromatography," Reinhold Publishing Corp., 1st Ed., 1957, in chap. VI. Keulemans includes comprehensive discussions of the selectivity of the stationary liquid on the basis of Hildebrand's solubility parameters and the contributions of the different cohesive energy forces, including Hecker's classifications in the order of decreasing cohesive energy.

One of the characteristics required of the stationary liquid is that it exhibit sufficient solubility for the components of the sample stream to provide a residence time within the column sufficient to allow a separation of the various constituents of the sample stream into discrete phases. Another characteristic is that the solvent must have a selectability or selectivity with respect to the various components of the sample stream so that the discrete phases will be formed during this residence time. Still further, the stationary liquid must exhibit properties of stability both with respect to the temperature maintained within the column and with respect to the sample stream. The stationary liquid must not vaporize nor suffer thermal degradation, nor must it enter an irreversible reaction with the components of the sample stream.

In the gas chromatographic analysis of higher boiling fractions, for instance, hydrocarbons containing 10 or more carbon atoms and petroleum sulfur compounds, the requirement of lack of volatility of the stationary liquid at the column temperatures becomes important. It is in this area that the prior art liquids have proved unsatisfactory.

The present invention will be further illustrated by reference to the drawing in which there is illustrated a preferred mode of practicing the invention and in which.

Figure 1:
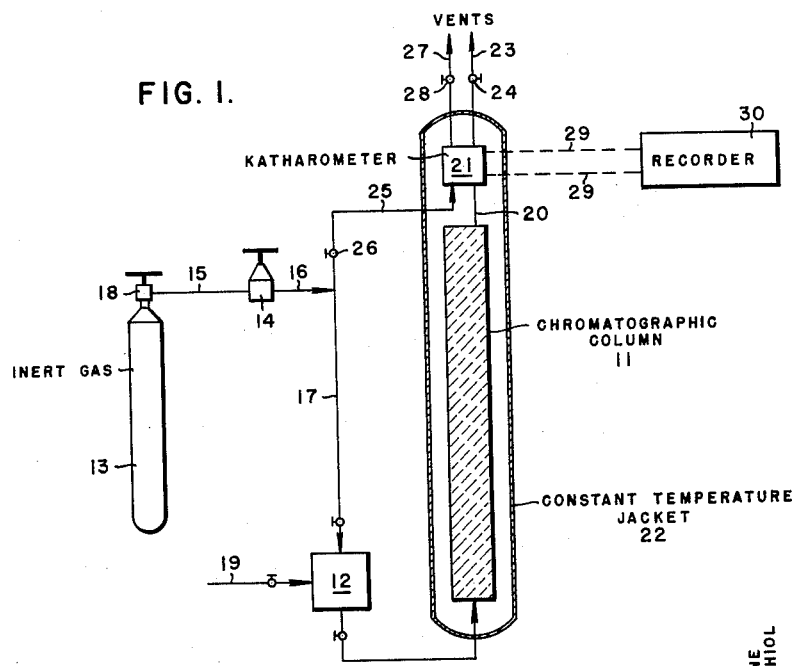
FIG. 1 is a schematic representation of the apparatus to be used in the practice of the present invention.

Referring now in particular to FIG. 1, the practice of the present invention is accomplished by charging to the chromatographic column 11 a known volume of hydrocarbon. This is accomplished by the use of means 12, which may satisfactorily comprise an isolation chamber for the measurement of the gaseous sample at standard conditions or at reference conditions, and which is swept clear of the sample by means of inert gas from the cylinder 13 by way of pressure reduction valve 14 and lines 15, 16, and 17. The valve 18 represented on the cylinder 13 is the standard "on-off" valve which is a part of these commercially available cylinders. The hydrocarbon sample is introduced into the standard chamber 12 by way of line 19. It is to be understood that the inert gas from cylinder 13 flows at a constant rate throughout the period of analysis, so that during the passage of the hydrocarbon sample through the column, there is present at all times in admixture with the various components of the mixture a certain amount of the inert carrier gas which, incidentally, is always moving relative to the components of the hydrocarbon sample mixture. At the inception of the sample period, the hydrocarbon sample is carried into the lower portion of column 11 by the inert gas, which is preferably helium. As the stationary liquid exercises a selective absorptivity to the components in the hydrocarbon mixture and also with respect to the inert gas (which is relatively insoluble in the stationary liquid), the components in the hydrocarbon mixture tend to separate with the least soluble components of the mixture moving through the column at a higher linear rate than the more absorbent components of the mixture. As the sample period continues, the elution gas, together with the various components which are separated in the passage through the column, is carried upwardly and out of column 11 by line 20. It should be noted here that in a properly designed and operated column the components of the hydrocarbon mixture will be segregated into mixtures of the individual components with the elution gas separated by phases of pure gas of elution. This makes possible the use of the katharometer 21, for example, to determine the presence of a given compound, as will be more particularly pointed out herein below. The column 11 with the katharometer 21 is enclosed by a constant temperature jacket 22, which maintains the system at a substantially constant and unvarying temperature throughout the course of the analysis period. The elution gas and the components of the hydrocarbon sample pass from the column 11 through the katharometer 21 and are discharged from the constant temperature jacket by means of line 23, controlled by valve 24. The katharometer 21 is made up of two chambers, in each of which is provided a glowing wire which changes in its electrical conductivity by the change in temperature of the wire. This temperature change is accomplished by the conduction of heat from the wire by the gases that are passing through the cells. There are, of course, other types of transfer of the heat, that is, by radiation losses and by convection, but by using a comparison cell, these losses are balanced out. This comparison cell is in substantially the same position as the cell receiving the gas of elution with the included hydrocarbon components and is swept by a similar volume of the gas of elution, which is passed directly from the cylinder 13 by way of lines 15 and 16, governed by the pressure reduction valve 14, and thence into the standard cell or comparison cell by way of line 25, which is controlled by valve 26. The standard gas, that is the inert gas which is passed through the comparison cell, is then discharged from the thermal conductivity cell and the constant temperature jacket by way of line 27, which is controlled by a valve 28. By using a comparison cell which measures the heat loss in the gas of elution, the katharometer is enabled to measure the difference in thermal conductivity which is due to the presence of the hydrocarbon components, which have been broken down into discrete phases within the column 11. This difference in thermal conductivity is indicative both of the type of hydrocarbon which is passing from the column and also the amount of the particular hydrocarbon which is present in the elution gas as it passes through the cell. The katharometer 21 generates a signal which is proportional to the change of thermal conductivity over that of the elution gas, and this signal is transmitted by way of lines 29 to a chart recorder 30. This chart recorder is preferably of the type which utilizes a linear chart which moves at a constant rate per minute. These linear charts, as is known in the art, are passed from a spool containing the blank chart through the recorder device and onto a take-up spool at the other end of the recorder. Since the speed of travel of the chart through the recorder is constant, then it is possible to determine the time period during which the particular fraction of hydrocarbon component is passing through the thermal conductivity cell. This time period is measured by the breadth or width of the peak upon the chromatogram. The height of the peak upon the chromatogram is indicative of the amount and type of hydrocarbon which is passing through in admixture with the elution gas. At the beginning of an analytical run, the column 11 will contain a certain amount of air, and as the inert gas passes upwardly through the column 11, this air will be discharged through the line 20 and the thermal conductivity cell of katharometer 21. Since air will give its own individual deflection upon the recorder by reason of its particular thermal conductivity, this provides a convenient initial point from whence to measure the time scale upon the chromatograph. This is referred to in the art as the injection point. Since the residence time of the particular hydrocarbon components within a given column at given operating conditions can be discovered, and the machine calibrated therefor, it is possible to obtain a qualitative analysis of the hydrocarbon stream by measuring the distance along the recorder chart from the injection point to the particular peak which has been produced. The quantitative analysis of the hydrocarbon within the stream is then obtained by calculation from the base width of the peak as well as the height thereof.

It is one aspect of this invention to provide a liquid solvent suitable for the separation of petroleum sulfur compounds. In the past, it has been suggested to use tricresol phosphate for the separation of methane through propane mercaptans, ethane through butane sulfides and thiophene. This solvent has also been reported as to relative retention times for 8 mercaptans, 5 sulfides, and 11 thiophenes, by C. H. Amberg in vol. 36 of the "Canadian Journal of Chemistry," p. 590, 1958. This liquid solvent has proved to be unsatisfactory because it is not sufficiently polar. Another solvent suggested for use over a wide range of sulfur compounds, that is, propane through hexane sulfide, thiacyclopentane, 2-methylthiacyclopentane, thiophene, and 3-methyl thiophene, is a combination of benzyl diphenyl and hexatriacontane. This solvent suffers from decreasing polarity with increasing hexatriacontane content, and increasing volatilization within the column with increasing benzyl diphenyl content.

A solvent which has been demonstrated as useful in this field is bis(ethylhexyl)tetrachlorophthalate. The use of tetrachlorophthalates in this particular field was demonstrated by Langer et al. in the publication "Chemical Industries," p. 1145, 1958. In order to obtain a comparison of the solvent of the present invention with a well-known solvent used in a comparable manner, a series of tests were run utilizing the polyepichlorohydrin solvent of the present invention and the ethylhexyl tetrachlorophthalate known to the art. The specific retention volumes for petroleum sulfur compounds in each of these two solvents have been compared in Table I. Note also the closeness of boiling points of the various components; e.g., thiophene (84° C.) and 2-butanethiol (85° C.).

TABLE I

Specific Retention Volumes for Petroleum Sulfur Compounds

| Petroleum Sulfur Compound | B.P., ° C. | Solvent for GLPC | |
|---|---|---|---|
| | | Polyepichlorohydrin, Dow "Polyglycol 166-1150" | Ethylhexyl Tetrachlorophthalate |
| 2-methyl-2-propanethiol | 64 | 4.5 | 15.4 |
| 2-thiabutane | 67 | 6.2 | 16.3 |
| 1-propanethiol | 68 | 6.5 | 16.3 |
| 2-butanethiol | 85 | 7.5 | 20.9 |
| 3-methyl-2-thiabutane | 94 | 8.2 | 21.5 |
| 2-methyl-1-propanethiol | 89 | 8.2 | 21.5 |
| 3-thiapentane | 92 | 9.4 | 23.7 |
| 1-butanethiol | 98 | 10.5 | 25.7 |
| Thiophene | 84 | 12.4 | 26.7 |
| 1-pentanethiol | 127 | 16.7 | 42.0 |
| 2-methyl thiophene | 113 | 18.9 | 43.6 |
| 3-methyl thiophene | 115 | 20.7 | 45.6 |
| Thiacyclopentane | 119 | 29.6 | 47.3 |
| 3,4-dithahexane | 153 | 38.3 | 82.0 |
| Thiacyclohexane | 141 | 40.5 | 72.5 |

The data of Table I include a comparison of specific retention volumes of the various components in the selected stationary liquids. The specific retention volumes are indicative of the resolution which can be realized from a particular solvent. Where two compounds have substantially the same specific retention volumes in a solvent, no chromatographic separation thereof can be made. Conversely, where the specific retention volumes are different, separation can be made even though the constituents may boil at substantially the same temperature. For example, in using polyepichlorohydrin as the stationary liquid, thiophene (B.P. 84° C.) and 2-butanethiol (B.P. 85° C.) have retention volumes of 12.4 and 7.5, respectively. The separation of these components is thus easily accomplished in spite of the closeness of boiling points.

The data of Table I were obtained by preparing a synthetic mixture consisting of 15 of the API-6 certified standards comprising thiol, sulfide, cyclic sulfide, and thiophenes boiling in the 64° through 153° C. range. The polyepichlorohydrin provided sharp separation of 14 compounds in the 15 component synthetic. It is to be noted that the only two components which were not resolved were the 3-methyl-2-thiabutane and 2-methyl-1-propanethiol. Note also that in the ethylhexyl tetrachlorophthalate the 2-thiabutane and 1-propanethiol as well as the 3-methyl-2-thiabutane and 2-methyl-1-propanethiol produced the same retention volumes. The residence time using polyepichlorohydrin was only 22 minutes, whereas the time requirement in using the ethylhexyl tetrachlorophthalate was 28 minutes. On a strictly theoretical plate basis, the polyepichlorohydrin produced 217 plates/ft. as compared to 189 plates/ft. in the ethylhexyl tetrachlorophthalate. It is thus seen that the polyepichlorohydrins provide a markedly superior solvent for the separation of the sulfur compounds over the solvent known to the prior art.

Figure 2:
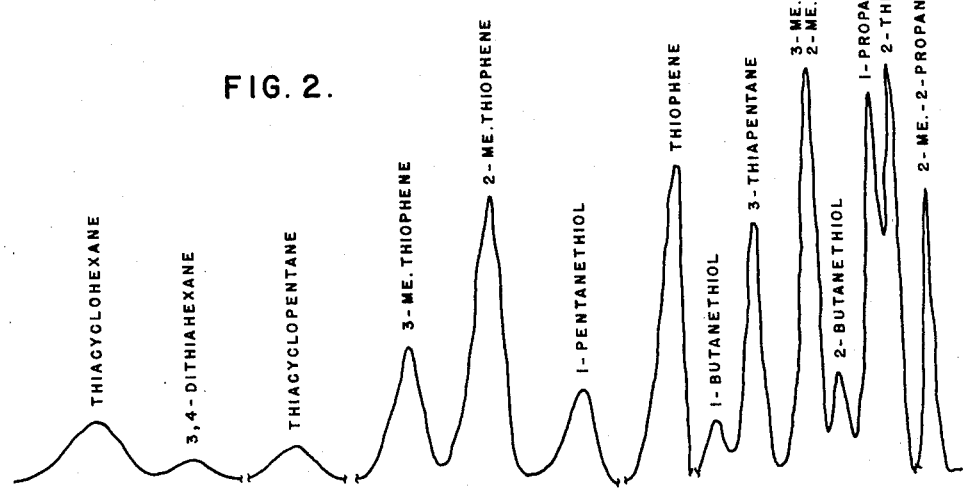
FIG. 2 is a chromatogram of the resolution of a petroleum sulfur compound fraction using polyepichlorohydrin as the stationary liquid.

A reference to FIG. 2 will disclose a chart whereon the chromatographic curve of this mixture is shown. The peaks indicate the thermal conductivity of the various constituents of the sample stream. The height and width of each of these peaks indicates the amount of the various components. The curve which is depicted in FIG. 2 was obtained by running the standard sample of the petroleum sulfur compounds through a column using polyepichlorohydrin solvent. The gas chromatographic unit was a 154C Perkin-Elmer apparatus using a 20 ft. long column of 1.4 in. diameter. The solvent was supported on a 40 to 60 mesh acid treated firebrick with a charge stock of the hydrocarbon sample of 0.005 ml. The column was maintained at a constant temperature of 150° C. with the inlet pressure to the column maintained at 25 p.s.i.g. Helium was circulated as the elution gas at a rate of 59 ml. per minute.

Figure 3:
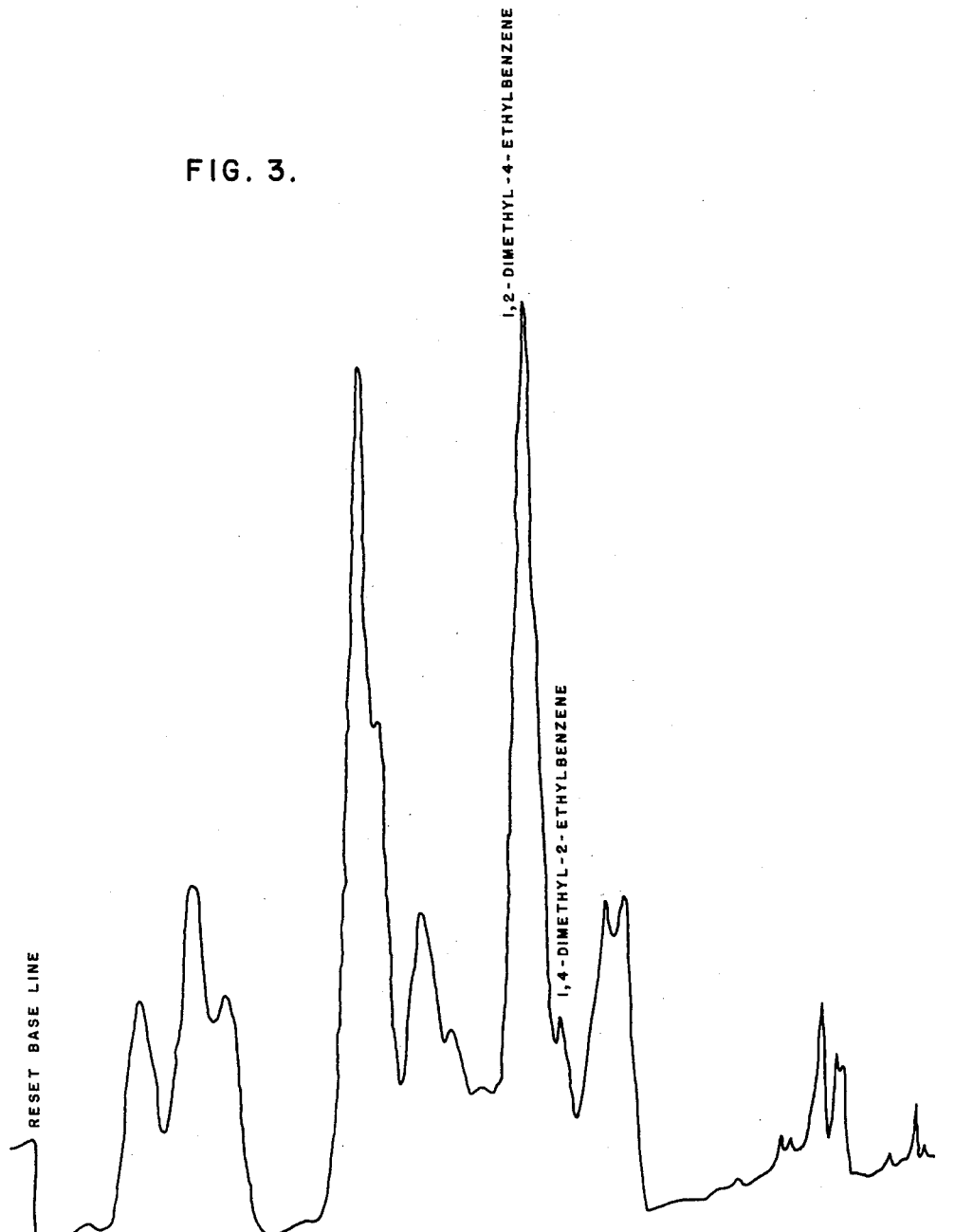
FIG. 3 is a chromatogram of Solvesso 150 using polyepichlorohydrin as the stationary liquid.

FIG. 3 depicts a chromatographic curve from the analysis of Solvesso 150 by the present process. Solvesso 150 contains hydrocarbons in the range of 8 to 12 carbon atoms and boils in the range of 290° to 450° F., with an aromatic content between 90% and 98%. It contains 1,4-dimethyl-2-ethylbenzene and 1,2-dimethyl-4-ethylbenzene. These compounds are normally difficult to separate. However, polyepichlorohydrin accomplishes the differentiation as seen in FIG. 3.

The polyepichlorohydrin solvent used in the practice of the present invention is marketed by the Dow Chemical Company under the designation "Polyglycol 166," containing polyepichlorohydrin of varying degrees of polymerization. The properties of this solvent are listed below in Table II. The approximate average molecular weight of the polymers in the solvent is around 1150. The chemical formula for this polymer is given as $$HO(C_3H_5ClO)_n C_3H_5ClOH$$

TABLE II

*Properties of Polyglycol 166* [1] *(Polyepichlorohydrin)*

| Designation: | Polyglycol 166–1150 |
|---|---|
| Specific gravity at 25/25° C. | 1.328 |
| Refractive index at 25° C. | 1.504 |
| Viscosity at 100° F. cks | 1918 |
| Viscosity at 210° F. cks | 60.9 |
| Viscosity index | 95 |
| APHA color | 500+ |
| Pour point, ° F. | 51 |
| Flash point, ° F. | 500 |
| Fire point, ° F. | 520 |
| Solubility at 25° C. (g./100 g. solvent)— | |
| Acetone | 100+ |
| Benzene | 100+ |
| Carbon tetrachloride | 100+ |
| Ethyl ether | 100+ |
| n-Heytane | <0.1 |
| Methanol | 100+ |
| n-Heptane | <0.1 |
| Percent OH | 2.93 |
| Percent Cl | 32.5 |

[1] The Dow Chemical Company.

It is to be understood that, although the elution type of chromatographic analysis has been disclosed as the preferred mode of practicing this invention, the stationary liquid may be used as well in the frontal analysis or displacement methods of chromatographic analysis, or merely for physical separation of the constituent compounds.

Applicant, having disclosed in detail the essence of his invention and having set forth a preferred mode of practicing it, hereby seeks to secure Letters Patent not limited by the above disclosure, but only by the appended claims.

I claim:
1. A method of chromatographically separating thiohydrocarbons which comprises passing said thiohydrocarbons in admixture through an elongated chromatographic column having a stationary phase of polyepichlorohydrin having a molecular weight range of 400 to 2000 and an average molecular weight of 1150, at a temperature above 64° C., whereby said admixture is resolved into its components.

2. A method in accordance with claim 1 wherein the thiohydrocarbons include thiophene and 2-butanethiol.

References Cited in the file of this patent
UNITED STATES PATENTS

| 2,839,152 | Tracht | June 17, 1958 |
| 2,875,849 | Edwards et al. | Mar. 3, 1959 |
| 2,891,073 | Smith | June 16, 1959 |
| 3,032,953 | Micheletti | May 8, 1962 |

OTHER REFERENCES

"Condensed Chemical Dictionary," 4th Edition, Reinhold Publishing Corporation, New York 18, N.Y.

Pecsok, R. L.: Principles and Practice of Gas Chromatography, N.Y., John Wiley and Sons, 1959.

Karchmer, J. H.: Gas-Liquid Partition Chromatography of Sulfur Compounds With Beta, Beta'-Iminodipropionitrile. In Analytical Chemistry 31 (8), pp. 1377–1379, August 1959.

Tenney, H. M.: The Selectivity of Various Liquid Substrates Used in Gas Chromatography. In Joint Symposium on Progress in Gas Chromatography presented before Division of Petroleum Chemistry, American Chemical Society.

Dow Chemical Company, Properties of Polyglycol 166, July 1959.